United States Patent
Garcia-Verona et al.

(10) Patent No.: US 8,321,340 B2
(45) Date of Patent: Nov. 27, 2012

(54) ADJUSTABLE MOUNTING APPARATUS FOR A PERIPHERAL DEVICE OF A SELF-SERVICE RETAIL ITEM CHECKOUT STATION

(75) Inventors: Luis Garcia-Verona, Suwanee, GA (US); Manuel Orit, Jr., Mandaue City (PH)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/817,253

(22) Filed: Jun. 17, 2010

(65) Prior Publication Data

US 2011/0313914 A1    Dec. 22, 2011

(51) Int. Cl.
*A47B 96/06* (2006.01)
(52) U.S. Cl. ............... 705/39; 248/299.1; 248/309.4
(58) Field of Classification Search ............... 705/39; 248/225.11, 299.1, 309.1; 235/383, 380; 411/259
See application file for complete search history.

(56) References Cited

U.S. PATENT DOCUMENTS

| | | | | |
|---|---|---|---|---|
| 4,768,744 A * | 9/1988 | Leeds et al. | | 248/280.11 |
| 5,713,549 A * | 2/1998 | Shieh | | 248/284.1 |
| 5,842,672 A * | 12/1998 | Sweere et al. | | 248/278.1 |
| 5,917,741 A * | 6/1999 | Ng | | 708/497 |
| 6,347,776 B1 * | 2/2002 | Chuang | | 248/288.51 |
| 6,367,756 B1 * | 4/2002 | Wang | | 248/278.1 |
| 6,517,040 B1 * | 2/2003 | Wen | | 248/278.1 |
| 6,592,090 B1 * | 7/2003 | Li | | 248/284.1 |
| D495,713 S * | 9/2004 | Pfister et al. | | D14/451 |
| 2002/0084396 A1 * | 7/2002 | Weaver | | 248/278.1 |
| 2004/0254020 A1 * | 12/2004 | Dragusin | | 463/46 |
| 2006/0144934 A1 * | 7/2006 | Fletcher et al. | | 235/383 |
| 2009/0289159 A1 * | 11/2009 | O'Keene | | 248/225.11 |

* cited by examiner

*Primary Examiner* — Lindsay M. Maguire

(74) *Attorney, Agent, or Firm* — Michael Chan; Paul W. Martin

(57) ABSTRACT

A self-service retail item checkout station comprises a peripheral device for interacting with a customer while the customer is conducting a self-service retail item checkout transaction at the station. The self-service retail item checkout station further comprises a non-swiveling mounting mechanism including (i) a slidable mounting portion on which the peripheral device is mounted, and (ii) a fixed mounting portion on which the slidable mounting portion is supported for sliding movement between a retracted position in which a customer in a standing position at the station can more easily interact with the peripheral device an extended position in which a customer in a seated position at the station can more easily interact with the peripheral device.

7 Claims, 7 Drawing Sheets

ADJUSTABLE MOUNTING APPARATUS FOR A PERIPHERAL DEVICE OF A SELF-SERVICE RETAIL ITEM CHECKOUT STATION

BACKGROUND

The present invention relates to self-service retail item checkout stations, and is particularly directed to an adjustable mounting apparatus for a peripheral device of a self-service retail item checkout station.

A typical peripheral device of a self-service retail item checkout station is usually intended for customer use while the customer is conducting a self-service retail item checkout transaction. Examples of such different peripheral devices include a signature capture pad, a personal identification number (PIN) pad, a magnetic stripe reader (MSR), a smart card reader, and a customer interface display (CID). Each peripheral device is usually positioned so that a customer can easily interact with the peripheral device from a standing position. While the peripheral device is located so that a customer in a standing position can easily interact with the device, a seated person is unable to easily interact with the device in the same location. Since the seated customer may not be able to easily interact with the peripheral device in the seated position, the location of the device may not comply with American with Disabilities Act (ADA) guidelines.

A known solution to comply with ADA guidelines is to mount the peripheral device on an adjustable swivel mechanism which allows the device to be moved between a first position in which a standing person can easily interact with the device and a second position in which a seated person can easily interact with the device. A drawback in mounting the peripheral device on an adjustable swivel mechanism is that such a mechanism tends to shift position while using the device. Accordingly, an adjustable swivel mechanism tends to need re-adjusting from time to time. It would be desirable to provide an improved adjustable mechanism on which a peripheral device of a self-service retail item checkout station can be mounted.

SUMMARY

In accordance with one embodiment of the present invention, a self-service retail item checkout station comprises a peripheral device for interacting with a customer while the customer is conducting a self-service retail item checkout transaction at the station, and a non-swiveling mounting mechanism including (i) a slidable mounting portion on which the peripheral device is mounted, and (ii) a fixed mounting portion on which the slidable mounting portion is supported for sliding movement between a retracted position in which a customer in a standing position at the station can more easily interact with the peripheral device an extended position in which a customer in a seated position at the station can more easily interact with the peripheral device.

DETAILED DESCRIPTION

Figure 1:
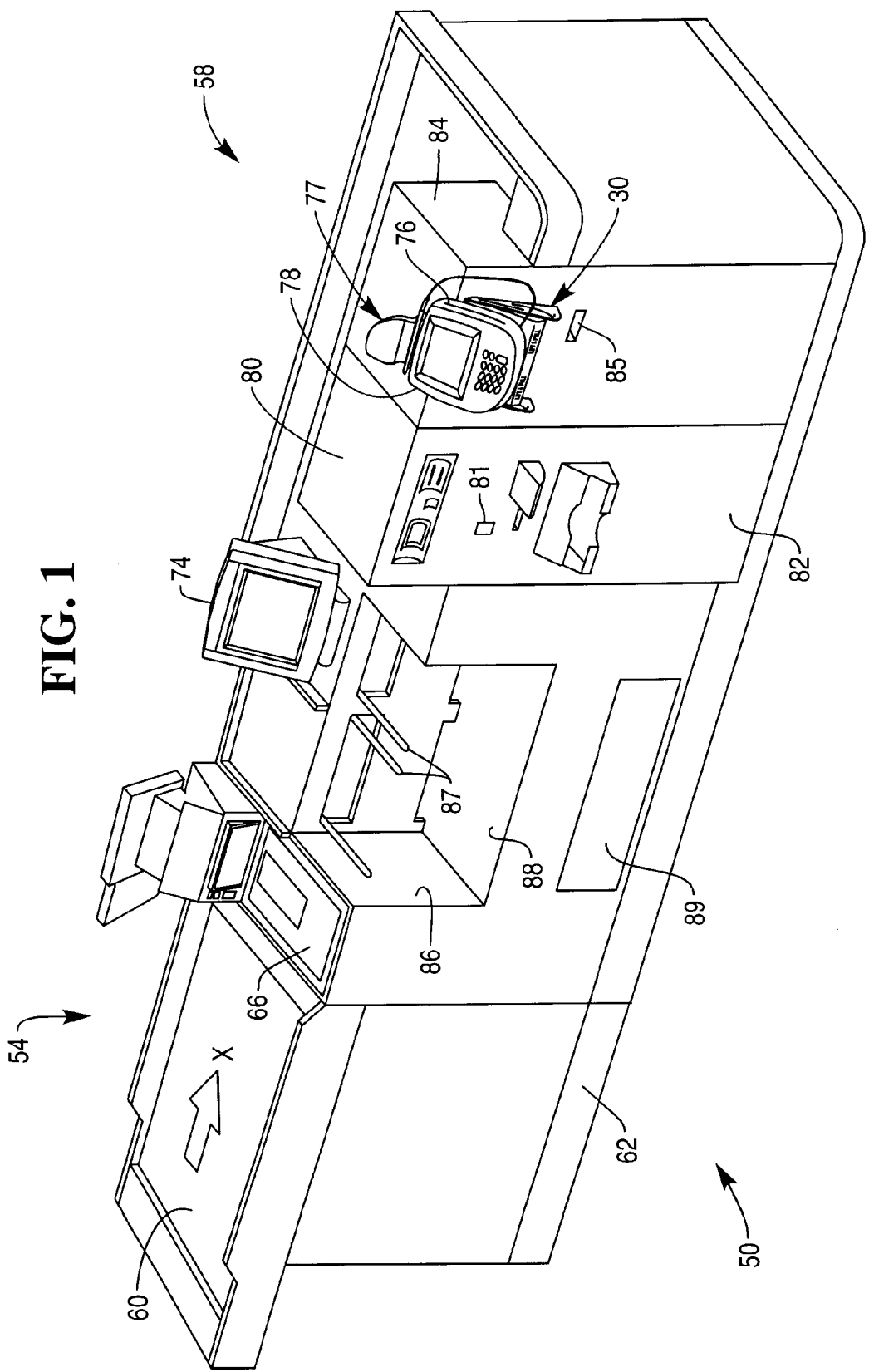
FIG. 1 is a perspective view of a self-service retail item checkout station embodying an adjustable mounting apparatus which is constructed in accordance with one embodiment of the present invention.

The present invention relates to self-service retail item checkout stations, and is particularly directed to an adjustable mounting apparatus for a peripheral device of a self-service retail item checkout station 50 such as shown in FIG. 1. The checkout station 50 may comprise any type of station which allows a customer to conduct a self-service retail item checkout transaction which involves a sale of retail items (such as groceries) to the customer. The customer may make cash payment for the purchase of such goods, and receive cash change back after cash payment has been made.

The checkout station 50 may include a feeder unit 54 and a checkstand unit 58. Feeder unit 54 includes a feeder belt 60 and housing 62 for motor and control circuitry that operates the feeder belt. Feeder unit 54 is movably coupled to checkstand unit 58 so the feeder belt 60 may be aligned with a scanner/scale module 66 of the checkstand unit 58.

Checkstand unit 58 includes the scanner/scale module 66, a customer interface terminal 74, an upper currency module 80, a lower currency module 82, and a receipt printer module 84. Scanner/scale module 66 uses a laser shining on a glass or other transparent platen to input data from bar codes applied to products or packages. Scanner/scale module 66 may also include a scale for measuring the weight of articles that are sold on a price/unit of weight basis. Customer interface terminal 74 displays article data as it is entered through the scanner/scale module 66.

The upper currency module 80 receives currency and coins from a customer as payment for a transaction. The upper currency module 80 also includes a coin dispenser 81 that returns the coin portion of the customer's change while the lower currency module 82 returns the bill portion of the customer's change. The upper currency module 80 may also include a cash recycling unit (not shown) to provide cash received from customers in the change dispensed to customers. The receipt printer module 84 has a receipt dispense slot 85 through which a transaction receipt can be delivered to a customer. The receipt itemizes the articles purchased and the method of payment.

Receipt printer module 84 and scanner/scale module 66 may be separated by a bag well 86 having a security scale 88 for its floor. Bags for storing articles that customers have scanned and weighed are hung from hanging rails 87 in bag well 86. Security scale 88 uses article weight data derived from scanner/scale 66 or a database using a scanned unit product code (UPC) to verify that only the articles scanned are placed on the security scale. Security application programs operating within customer interface terminal 74 monitor security scale 88 to determine whether articles not scanned have been added to the security scale area. A database, disk drive, or other computer peripheral required for station operation may be housed within peripheral tray 89 located within checkstand unit 58.

The self-service checkout station 50 further includes a card reader 76 which enables a customer to make payment for purchased items. The card reader 76 may support credit card, debit card, and other payment methods. As an example, the card reader 76 may be of the type which reads a magnetic-striped card. Alternatively, the card reader 76 may be of the type which reads a smart card (i.e., a card which has an embedded integrated chip). It is also conceivable that the card reader 76 may be of the type which is capable of reading more than one type of card. Structure and operation of various types of card readers are conventional and well known and, therefore, will not be described further.

A signature capture pad 78 is integrated with the card reader 76. The signature capture pad 78 captures a customer's signature while the customer is conducting a self-service retail item checkout transaction at the checkout station 50. Structure and operation of the signature capture pad 78 is conventional and well known and, therefore, will not be described further. The integrated peripheral device comprising the combination of the card reader 76 and the signature capture pad 78 is referred to herein as "the integrated device 77". The integrated device 77 is mounted on an adjustable mounting apparatus 30 which will be described in detail hereinbelow.

Referring to FIG. 1, a customer may place articles on feeder belt 60 which is driven in the direction of arrow X to bring articles to the end of the belt where a shut-off mechanism stops the belt. The customer may then remove articles from belt 60 and move them, one at a time, over scanner/scale module 66 for article product data retrieval and/or weighing. Alternatively, the customer may pull a cart containing articles for purchase so it is adjacent feeder unit 62 and place articles from the cart onto scanner/scale module 66. It should be apparent that the flow of the customer is from left to right (as viewed looking at FIG. 1) while the customer is conducting the self-service retail item checkout transaction.

The scanned articles may then be placed in bags on security scale 88. Once all of the articles are scanned, the customer may provide payment through the card reader 76 or the upper currency module 80, receive change from the coin dispenser 81 and the lower currency module 82, and a receipt from the receipt printer module 84. The customer may then remove the bags from the security scale 88 and leave the checkout station 50. Operation of checkout station 50 is controlled by a processor that is typically incorporated within customer interface terminal 74.

Figure 2:
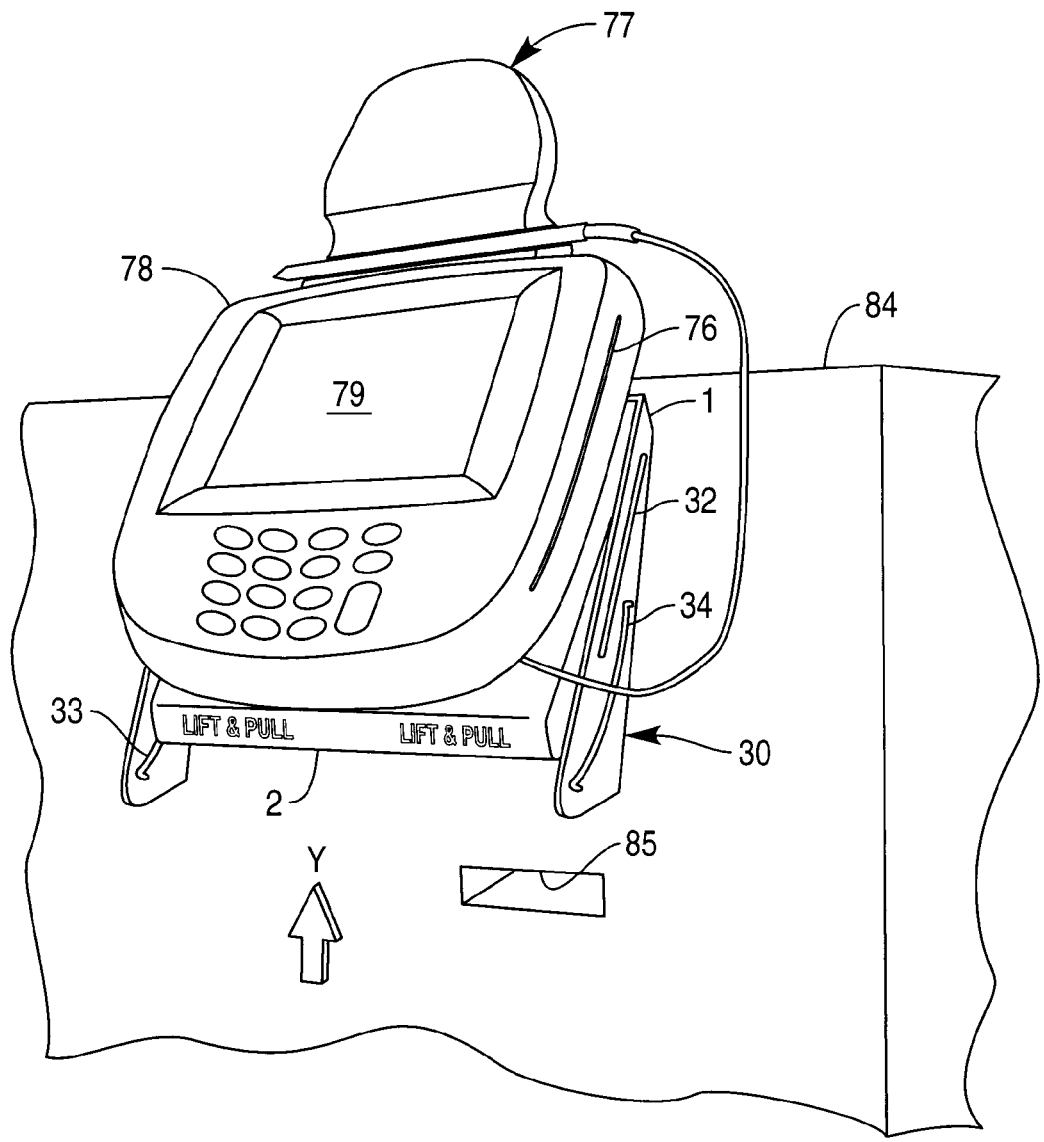
FIG. 2 is an enlarged perspective view of the adjustable mounting apparatus of FIG. 1, and showing the adjustable mounting apparatus in a retracted position.
Figure 3:
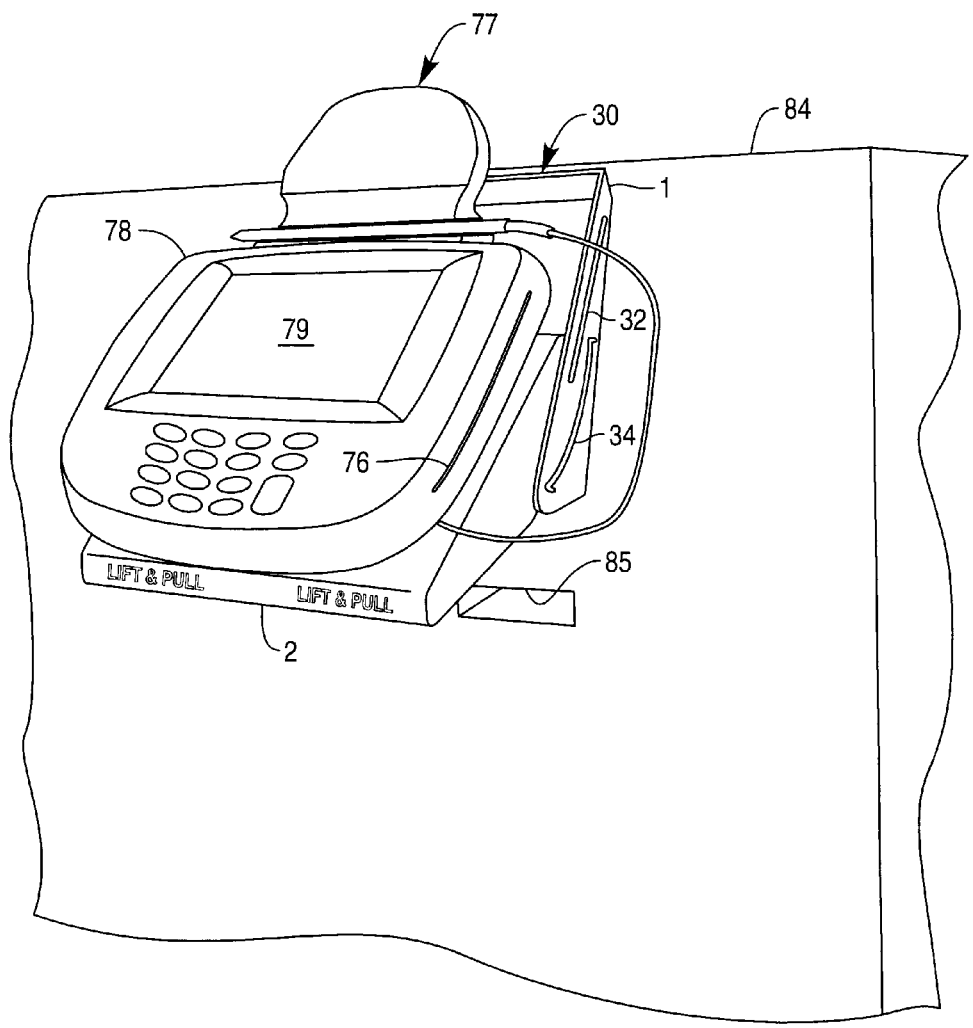
FIG. 3 is a perspective view similar to FIG. 2, and showing the adjustable mounting apparatus in an extended position.

Referring to FIG. 2, the integrated device 77 is mounted on the adjustable mounting apparatus 30 which is constructed in accordance with one embodiment of the present invention. The integrated device 77 is movable between a retracted or closed position (as shown in FIG. 2) to an extended or open position (as shown in FIG. 3). In the retracted position shown in FIG. 2, a writing surface 79 of the signature capture pad 78 can be easily viewed by a customer in a standing position at the checkout station 50. In the extended position shown in FIG. 3, the writing surface 79 of the signature capture pad 78 can be easily viewed by a customer in a seated position at the checkout station 50.

Figure 4:
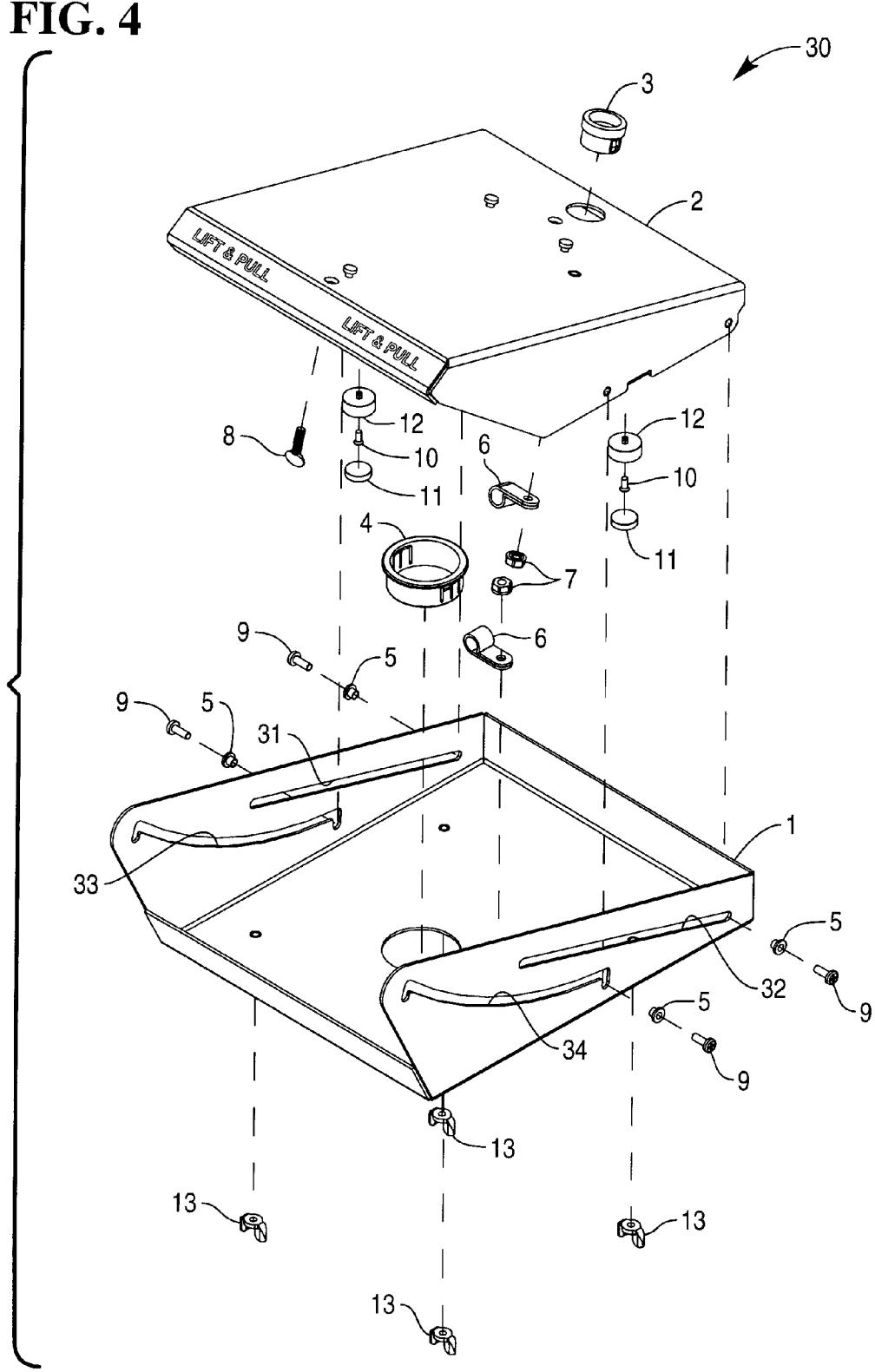
FIG. 4 is an exploded view of the adjustable mounting apparatus of FIG. 2, and showing various components including a slidable mounting portion of the adjustable mounting apparatus.

Referring to FIG. 4, an exploded view of the adjustable mounting apparatus 30 is illustrated. As shown in FIG. 4, components of the adjustable mounting apparatus 30 includes: a fixed mount portion 1; a slidable mount portion 2; a first plastic grommet 3; a second plastic grommet 4; four plastic spacers with shoulder 5; two cable clamps 6; two steel, blue zinc nuts 7; a spadehead thumbscrew 8; four threadlock screws 9; a pair of Phil flat screws 10; a pair of neodymium disc magnets 11; a pair of steel cups for magnets 12; and four wing nuts 13.

Figure 5:
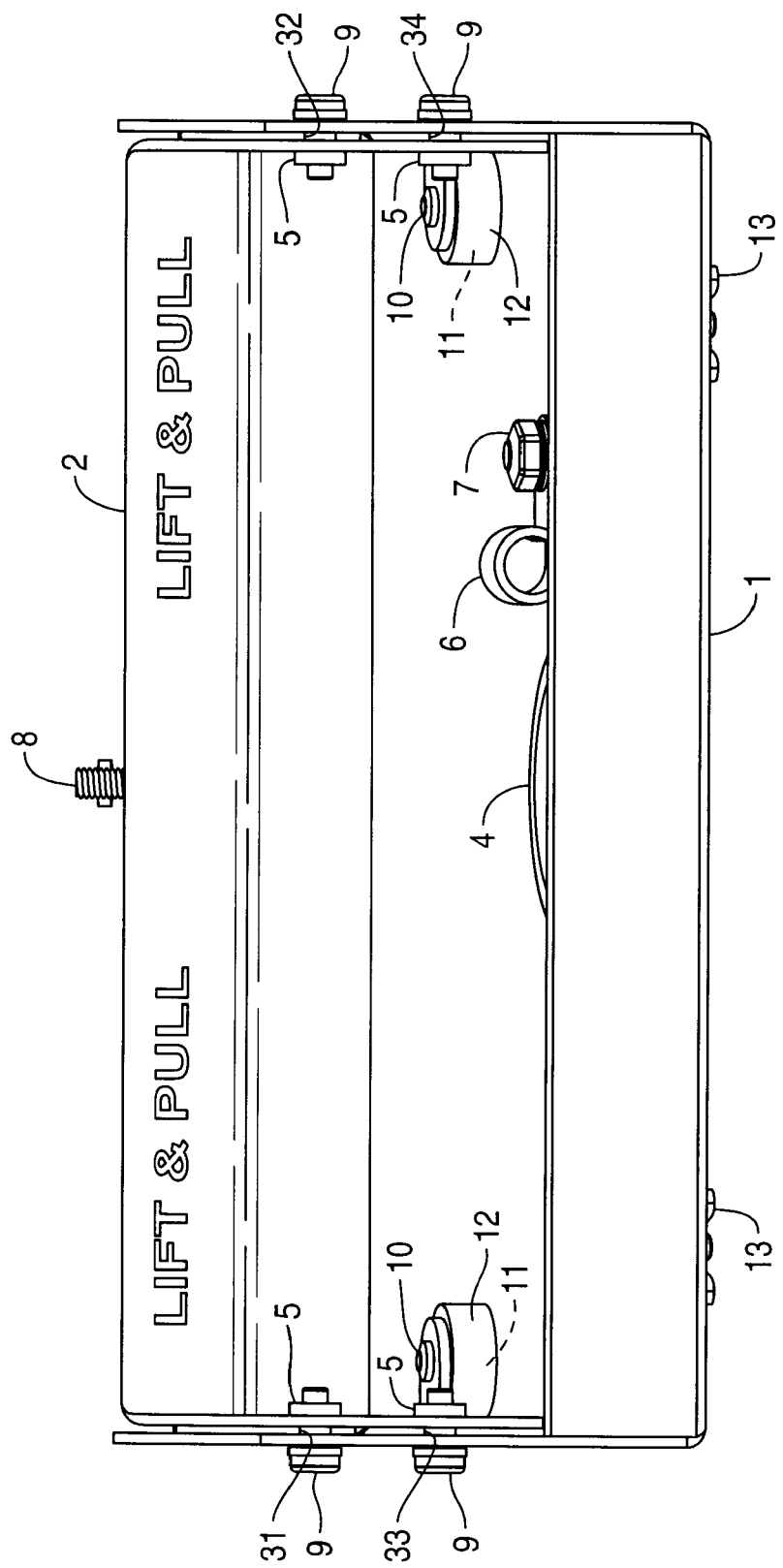
FIG. 5 is an elevational view, looking approximately in the direction of arrow Y in FIG. 2, and showing certain components of the adjustable mounting apparatus.

As shown in FIG. 4 and the detailed view of FIG. 5, a first one of the spacers 5 and a first one of the screws 9 are connected and slide within a first elongate opening 31; a second one of the spacers 5 and a second one of the screws 9 are connected and slide within a second elongate opening 32; a third one of the spacers 5 and a third one of the screws 9 are connected and slide within a first arcuate opening 33; and a fourth one of the spacers 5 and a fourth one of the screws 9 are connected and slide within a second arcuate opening 34. The four pairs of spacers 5 and screws 9 are held together with a suitable threadlike-type adhesive material such as Loctite 290 (trademark). When the slidable mount portion 2 is in the retracted position as shown in FIG. 2, the magnets 11 are attached to the fixed mount portion 1. This magnetic attachment prevents the slidable mount portion 2 from sliding away from the fixed mount portion 1.

Figure 6:
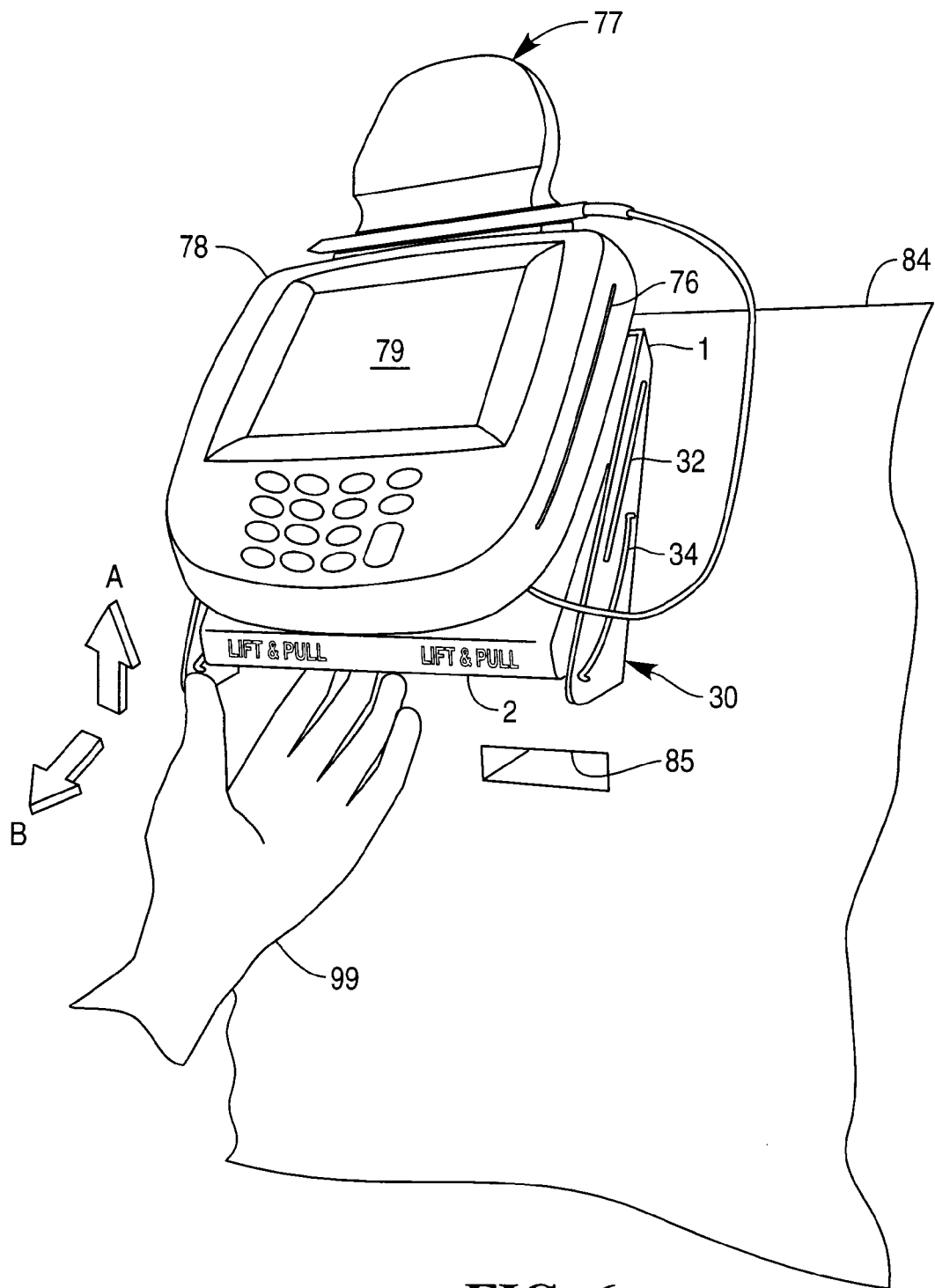
FIG. 6 is a perspective view of a customer's hand lifting and pulling the slidable mounting portion of FIG. 4 to move the adjustable mounting apparatus from the retracted position of FIG. 2 to the extended position of FIG. 3.

Referring to FIG. 6, when the slidable mount portion 2 is in the retracted position shown in FIG. 2 and a customer 99 lifts in the direction of arrow A and pulls the slidable mount portion 2 in the direction of arrow B, the magnets 11 separate away from the fixed mount portion 1. At the same time, the four pairs of spacers 5 and screws 9 cooperate to support the slidable mount portion 2 for sliding movement from the retracted position shown in FIG. 2 to the extended position shown in FIG. 3.

Figure 7:
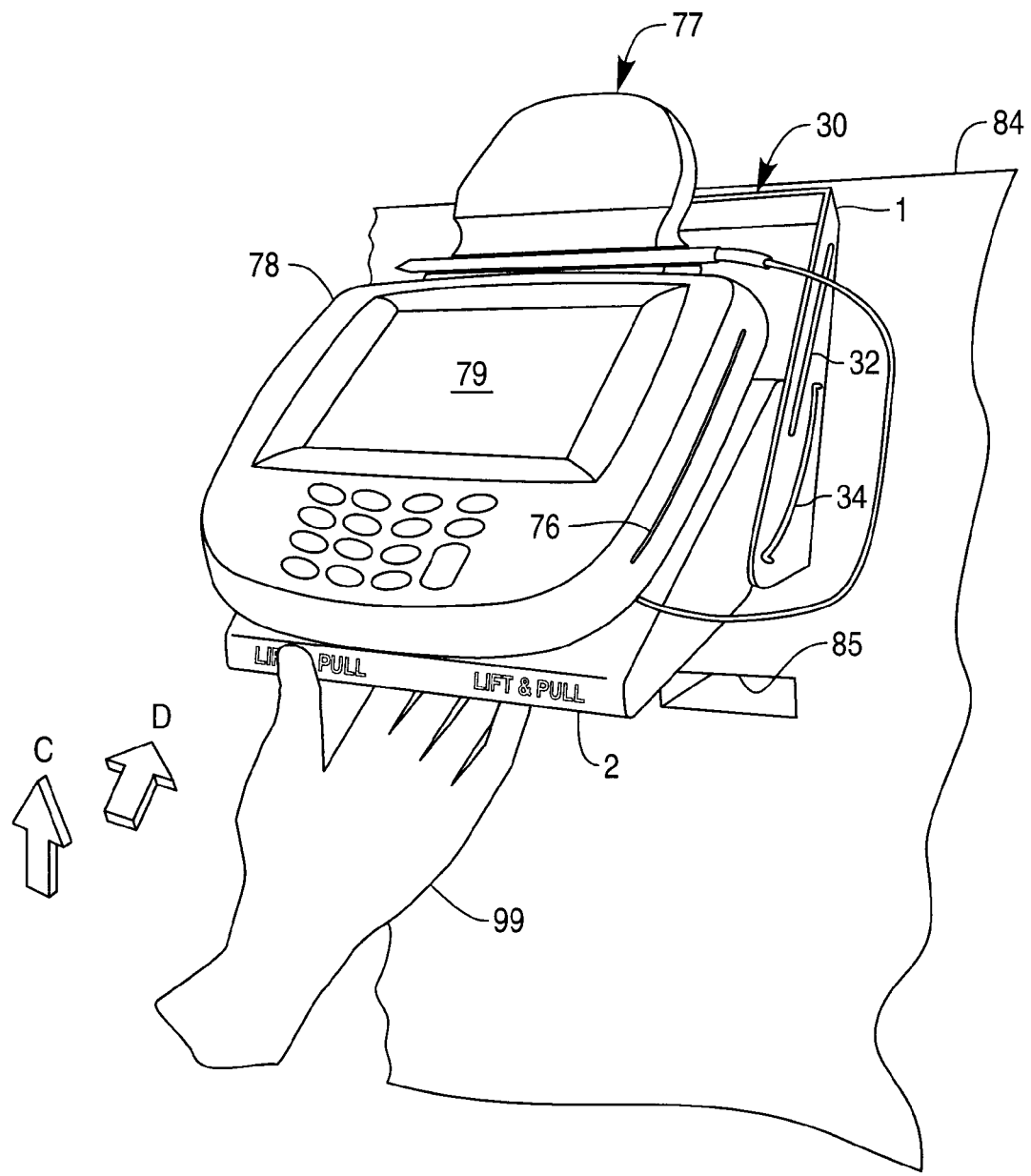
FIG. 7 is a perspective view similar to FIG. 6, and showing a customer's hand lifting and pushing the slidable mounting portion of FIG. 4 to move the adjustable mounting apparatus from the extended position of FIG. 3 back to the retracted position of FIG. 2.

Similarly, referring to FIG. 7, when the slidable mount portion 2 is in the extended position shown in FIG. 3 and the customer lifts in the direction of arrow C and pushes the slidable mount portion 2 in the direction of arrow D, the four pairs of spacers 5 and screws 9 cooperate to support the slidable mount portion 2 for sliding movement from the extended position shown in FIG. 3 back to the retracted position shown in FIG. 2. When the slidable mount portion 2 is back in the retracted position shown in FIG. 2 and the customer 99 stops lifting, the magnets 11 attach themselves again to the fixed mount portion 1 to prevent the slidable mount portion 2 from sliding off of the fixed mount portion 1. The magnetic attachment of the magnets 11 to secure the slidable mount portion 2 to the fixed mount portion 1 also provides positive tactile feedback to the customer for an improved user experience.

It should be apparent that the adjustable mounting apparatus 30 described hereinabove is without any swiveling parts. The apparatus 30 provides a non-swiveling type of mechanism in which a peripheral device (such as the integrated device 77 described hereinabove) can be discretely positioned such that both the location and the viewing angle of the writing surface 79 of the signature capture pad 78 are adjusted at the same time. Since the adjustable mounting apparatus 30 is swivelless, there is no need to re-adjust parts which swivel relative to each other and change position relative to each other over time.

It should also be apparent that the transaction receipt dispense slot 85 is not blocked when adjustable mounting apparatus 30 is in either the retracted position shown in FIG. 2 or the extended position shown in FIG. 3. When the adjustable mounting apparatus 30 is in its retracted position as shown in FIG. 2, the receipt dispense slot 85 is not blocked because the slidable mount portion 2 is not positioned in front of the slot. When the adjustable mounting apparatus 30 is in its extended position as shown in FIG. 3, the receipt dispense slot 85 is also not blocked even though the slidable mount portion 2 is in front of the slot 85. This is because the slidable mount portion 2 is at a sufficient distance away from the slot 85 such that the slot is not blocked and a customer can still access the slot to remove a transaction receipt which has been dispensed.

Also, by adjusting both the spatial position and viewing angle at the same time, a standing customer can better view the writing surface 79 of the signature capture pad 78 when the apparatus 30 is in the retracted position of FIG. 2 and a seated customer can better view the writing surface 79 of the signature capture pad 78 when the apparatus 30 is in the extended position of FIG. 3. Accordingly, location of the signature capture pad 78 complies with ADA guidelines. Moreover, a simple process (i.e., either lifting/pulling or lifting/pushing) is provided for the customer 99 to be able to easily move the apparatus 30 between the retracted and extended positions.

Although the above description describes a peripheral device in the form of the integrated device 77 (i.e., the card reader 76 and the signature capture pad 78), it is conceivable that the adjustable mounting apparatus 30 may be used with other peripheral devices. Examples of other peripheral devices include personal identification number (PIN) pads, magnetic stripe readers (MSRs), smart card readers (which can be of either the contact-type or the contactless-type), and customer interface displays (CIDs), and any combination of such peripheral devices. It is also conceivable that the signature capture pad 78 and the card reader 76 may be separate from each other, or either one may be integrated with another peripheral device.

Also, although the above description describes fasteners in the form of threadlock screws 9 which slide within the first and second elongate openings 31, 32 and the first and second arcuate openings 33, 34, it is conceivable that other types of fasteners be used.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A self-service retail item checkout station comprising:
   a peripheral device for interacting with a customer while the customer is conducting a self-service retail item checkout transaction at the station;
   a non-swiveling mounting mechanism including (i) a slidable mounting portion on which the peripheral device is mounted, and (ii) a fixed mounting portion on which the slidable mounting portion is supported for sliding movement between a retracted position in which a customer in a standing position at the station can interact with the peripheral device and an extended position in which a customer in a seated position at the station can interact with the peripheral device wherein the fixed mounting portion has (i) at least one elongate opening in which a fastener connected to one portion of the slidable mounting portion slides, and (ii) at least one arcuate opening in which a fastener connected to another portion of the slidable mounting portion slides so that both the spatial position and the viewing angle of the peripheral device changes at the same time when the peripheral device is moved between the retracted and extended positions and where a portion of each end of the at least one arcuate opening extends at an angle away from the direction of the adjacent arcuate opening and away from the slidable mounting portion where the length of each end portion is sufficient to receive the fastener and where the fastener is located in one of the end portions when the peripheral device is in the retracted position; and
   a magnet secured to one of the fasteners such that (i) the slidable mounting portion is magnetically attached to the fixed mounting portion when the peripheral device is in the retracted position, (ii) the magnet provides tactile feedback by moving the sliding fastener of the arcuate opening into one of the end portions when the slidable mounting portion moves to the retracted position, and (iii) the slidable mounting portion moves away from the fixed mounting portion when the slidable mounting portion is lifted to move the sliding fastener of the arcuate opening out of the end portion and pulled to move the slidable mounting portion from the retracted position to the extended position.

2. A self-service retail item checkout station according to claim 1, wherein the slidable mounting portion moves towards the fixed mounting portion when the customer lifts and pushes the slidable mounting portion to move the slidable mounting portion from the extended position to the retracted position.

3. A self-service retail item checkout station according to claim 1, wherein each of the fasteners comprises a threadlock screw.

4. A self-service retail item checkout station according to claim 1, wherein the peripheral device comprises an integrated device including a card reader and a signature capture pad.

5. A self-service retail item checkout station comprising:
   a signature capture pad having a writing surface;
   a mounting mechanism, without any swiveling parts, including (i) a slidable mounting portion on which the signature capture pad is mounted, and (ii) a fixed mounting portion on which the slidable mounting portion is supported for sliding movement between a retracted position in which a customer in a standing position at the station can view the writing surface of the signature capture pad and an extended position in which a customer in a seated position at the station can view the writing surface of the signature capture pad wherein (i) the fixed mounting portion has at least one elongate opening in which a fastener connected to one portion of the slidable mounting portion slides, and (ii) at least one arcuate opening in which a fastener connected to another portion of the slidable mounting portion slides so that both the spatial position and the viewing angle of the peripheral device changes at the same time when the signature capture pad is moved between the retracted and extended positions and where a portion of each end of the at least one arcuate opening extends at an angle away from the direction of the adjacent arcuate opening and away from the slidable mounting portion where the length of each end portion is sufficient to receive the fastener and where the fastener is located in one of the end portions when the signature capture pad is in the retracted position; and
   a magnet secured to one of the fasteners such that (i) the slidable mounting portion is magnetically attached to the fixed mounting portion when the signature capture pad is in the retracted position, (ii) the magnet provides tactile feedback by moving the sliding fastener of the arcuate opening into one of the end portions when the slidable mounting portion moves to the retracted position, and (iii) the slidable mounting portion moves away from the fixed mounting portion when the slidable mounting portion is lifted to move the sliding fastener of the arcuate opening out of the end portion and pulled to move the slidable mounting portion from the retracted position to the extended position.

6. A self-service retail item checkout station according to claim 5, wherein the slidable mounting portion moves towards the fixed mounting portion when the customer lifts and pushes the slidable mounting portion to move the slidable mounting portion from the extended position to the retracted position.

7. A self-service retail item checkout station according to claim 5, wherein each of the fasteners comprises a threadlock screw.

* * * * *